(12) United States Patent
Gilsdorf

(10) Patent No.: US 6,668,573 B1
(45) Date of Patent: Dec. 30, 2003

(54) GEOTHERMAL HEAT COLLECTOR TO COLLECT HEAT FOR A LOAD BY ACCESSING DEEP EARTH TEMPERATURES WITHOUT DRILLING, TRENCHING, OR OTHER EXCAVATION

(76) Inventor: Russell H. Gilsdorf, P.O. Box 433, Upper Lake, CA (US) 95485

( * ) Notice: Subject to any disclaimer, the term of this patent is extended or adjusted under 35 U.S.C. 154(b) by 0 days.

(21) Appl. No.: 10/054,025

(22) Filed: Jan. 18, 2002

(51) Int. Cl.[7] ............................................. F25D 23/12
(52) U.S. Cl. ........................................ 62/260; 165/45
(58) Field of Search ........................... 62/324.6, 260; 165/45, 134.1

(56) References Cited

U.S. PATENT DOCUMENTS

| | | | | |
|---|---|---|---|---|
| 4,993,483 A | * | 2/1991 | Harris | 165/45 |
| 5,394,935 A | * | 3/1995 | Glover | 165/45 |
| 5,816,314 A | * | 10/1998 | Wiggs et al. | 165/45 |
| 6,251,179 B1 | | 6/2001 | Allan | |

OTHER PUBLICATIONS

Econar Energy Systems www.econar.com FAQ p. 3.

* cited by examiner

*Primary Examiner*—Melvin Jones

(57) ABSTRACT

A geothermal heat collector for heat pumps and of the type having a heat conducting fin (18) which communicates at its conducting suface (18a) with the surface of the earth (14). A heat transfer fluid flows through the fin by way of a conduit (16) which carries the fluid to and from a load (10). An insulating cover (20) limits heat loss from the fin.

18 Claims, 11 Drawing Sheets

LEGEND

COIL HEIGHT

HEAT FLOW

DISTANCE FOR LATERAL HEAT FLOW

GEOTHERMAL HEAT COLLECTOR TO COLLECT HEAT FOR A LOAD BY ACCESSING DEEP EARTH TEMPERATURES WITHOUT DRILLING, TRENCHING, OR OTHER EXCAVATION

FEDERALLY SPONSORED RESEARCH

Not Applicable

SEQUENCE LISTING OR PROGRAM

Not Applicable

BACKGROUND

1. Field of Invention

This invention relates to heat exchangers, specifically to such exchangers as relate to collecting heat from the earth.

2. Description of Prior Art

Heat Pumps

Geothermal heat pumps, also called earth-coupled heat pumps, are commonly used to provide heating and cooling for conditioned spaces.

Heat Pump Technology

Originally, heat pumps used only the atmospheric air as a heat source or heat sink.

Because they are used to condition air inside a building, these are called air-to-air heat pumps.

In freezing temperatures, air-to-air heat pumps deteriorate in efficiency when operating in the heating mode. On the other hand, earth coupled heat pumps operating from a coil buried below the frost line show improved efficiencies in the heating mode, even in freezing weather.

At first earth coupled-coils were buried horizontally in trenches. Because deep earth temperatures are more stable, however, vertically drilled holes became an attractive alternative. Below 10 meters depth earth temperatures are constant year-round. Heat pumps operate more efficiently with a stable heat source.

But earth-coupled coils, whether horizontal or vertical, are costly to install. Horizontal systems require trenching equipment and sometimes even require a wide bucket backhoe. Trenches are a minimum of 1.2 meters deep. Vertical systems have the added disadvantage in that well drilling requires more specialized skills and equipment. Holes are typically 100 meters and more.

In either case, buried coils are susceptible to leaking, and are difficult or impossible to repair.

In addition, such coils are not readily installed in residential areas or in other places where the mess and the space requirements of trenching or drilling equipment cannot be tolerated.

Besides this, they have the added disadvantage in that once installed they cannot be moved; and the investment of drilling, trenching, or excavating, is irretrievably buried with the backfill.

Water source heat collection is also used. Closed loop systems often require permits and even engineering, as well as sufficient water to provide the necessary heat source or sink. Open loops have the additional disadvantage of coming under environmental review because they discharge water as a waste product. Sometimes this water is returned to an aquifer, thereby polluting the aquifer.

Other alternatives have been tried. Fluidized beds, buried containers, solar arrangements, and others. These have not succeeded.

Besides these, U.S. Pat. No. 6,251,179 to Allan (2001) discloses a cementitious grout for a bore hole; and Econar Energy Systems, www.econar.com, FAQ, page 3, teaches a slinky loop, coiled pipe, for a trench. While these improvements provide for shallower holes or shorter trenches, they still require drilling, trenching or other excavating.

Heat Exchanger Technology

The use of fins to enlarge the heat transfer area of heat exchangers is well established. Some common examples are the finned evaporators and condensers in home refrigerators; and the radiators, heaters, and air conditioners in automotive systems are other examples. All such exchangers are used to provide fluid-to-fluid heat exchange. Fluid-to-fluid heat exchangers provide an interface for heat transfer between fluids of differing temperatures. The heat transfer is primarily either by natural convection or by forced convection. Convective heat transfer is possible between fluids because of their nature. Solid, non-fluid substances, such as the earth, on the other hand, must transfer heat primarily by simple conduction.

Two solid, non-fluid, substances in thermal contact can provide their own interface for conductive heat transfer; but some type of heat exchange device needs to be provided if an exchange of heat between a solid and a fluid is desired. This solid-to-fluid heat exchanger must provide a conduit to contain the fluid, and to allow the fluid to pass through the exchanger. It must also provide a fin for convective heat transfer on the fluid side, and conductive heat transfer on the solid side.

At the same time, the fin must conform to both the shape of the flow of the fluid, as provided by the conduit, and the shape of the solid, e.g., the earth.

Finally, any non-conducting portion of the fin surface needs an insulating cover to minimize heat loss to any existing competing temperatures. Fluid-to-fluid heat exchangers do not provide an insulating cover. On the contrary, convective exchangers use all of the fin surface. This is because the fin extends entirely into the convective fluid where: there are no competing temperatures.

Typically, fluid-to-fluid exchangers feature a matrix of thin fins mechanically bonded, brazed, soldered, or welded to a conduit. This type of construction is complex and costly. In addition, this type of exchanger presents its fin edges, rather than its surface, to another surface when lying flat on the latter; and between the fins are gaps which are for full exposure to fluid flow, when these exchangers are used in fluid to-fluid applications. For conductive coupling to a solid, however, a fin must present its full conducting surface. Besides this, these present finned exchangers are premanufactured because they do not lend themselves to easy construction on the job. These premanufactured collectors are flat and therefore unsuitable for coupling to an irregular surface, such as naturally occurring rock. None of these finned exchangers is used for solid-to-fluid heat exchange, and in particular, none is used for earth coupled heat exchange.

In addition, no heat exchanger is available for direct coupling to the earth's surface, without drilling, trenching, or other excavating; and none has an insulating cover.

Cold Region Technology

Geotechnical engineers, designing for permafrost conditions, gave us expressions to predict the thermal regime under insulated, heated, or cooled surfaces. Their focus was to avoid the disastrous effects that can occur with freezing and thawing under construction projects. No application was suggested for the use of these expressions to access deep earth temperatures for heat pumps.

Combination of Disciplines

No combination of these three technologies has been disclosed to provide a heat collector for geothermal heat pumps, without drilling, trenching, or other excavation.

This is because such a combination was outside of the focus of each of them.

OBJECTS AND ADVANTAGES

Accordingly, the objects and advantages of the present invention are:

(a) to provide a collector which combines improved efficiency over air-to-air systems with economy of construction and installation;

(b) to provide a heat collector to collect geothermal heat directly from the surface of the earth; and which does not require drilling, trenching, excavating, or other special equipment or skills;

(c) to provide a collector for geothermal heat which does not require being buried in the earth;

(d) to provide a collector which can couple directly to the earth's surface;

(e) to provide a collector which can access deep earth temperatures without drilling, trenching, or other excavation;

(f) to provide a collector which does not pollute;

(g) to provide a collector which is cheap and easy to replace or repair;

(h) to provide a collector which is at least as leakproof, and as reliable, as are present earth coupled systems;

(i) to provide a collector which is inexpensive and easy to install;

(j) to provide a heat collector which is portable;

(k) to provide a heat collector which is simple to construct, and which can be constructed on the job;

(l) to provide a heat collector having a fin which can be poured, rammed, or spread, to conform to the heat source surface;

(m) to provide a heat collector which does not require a use permit;

(n) to provide a heat collector having a fin which does not require brazing, soldering or welding;

(o) to provide a heat collector having a fin for solid-to-fluid heat exchange;

(p) to provide a heat collector which will operate at non-freezing temperatures without being buried, even over permafrost;

(q) to provide a heat collector having a cover to stabilize operating temperatures; and a fin to condense the conducting surface into a small area;

(r) to provide a heat collector with a stable heat source without drilling, excavating or trenching;

(s) to provide a heat collector to conduct heat by conduction from a non-fluid heat source, and (t) to provide a heat collector which is insulated to minimize heat loss from its non-conducting fin surface;

Further objects and advantages of my invention will become apparent from a consideration of the drawings and ensuing description.

SUMMARY

In accordance with the present invention a geothermal heat collector comprises a heat transfer conduit with heat transfer fluid therein, a fin in thermal contact with the conduit, and an insulating cover.

DRAWINGS

Drawing Figures

In the drawings, closely related figures have the same number but different alphabetic suffixes.

DETAILED DESCRIPTION

FIG. 1—Description of Heat Collector

Preferred Embodiment

Figure 1A:
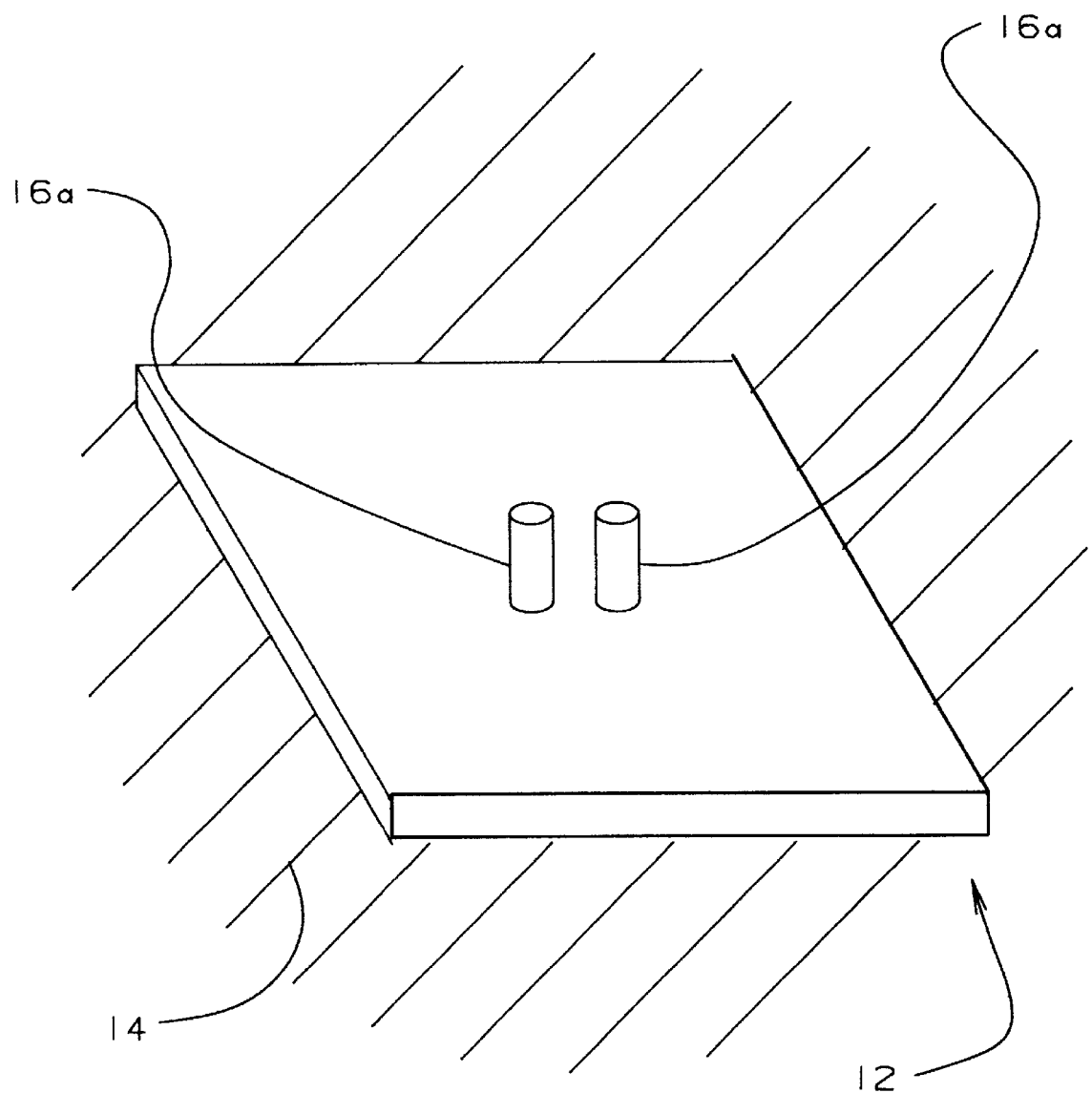
FIGS. 1A to 1C show various aspects of a heat collector.
Figure 1B:
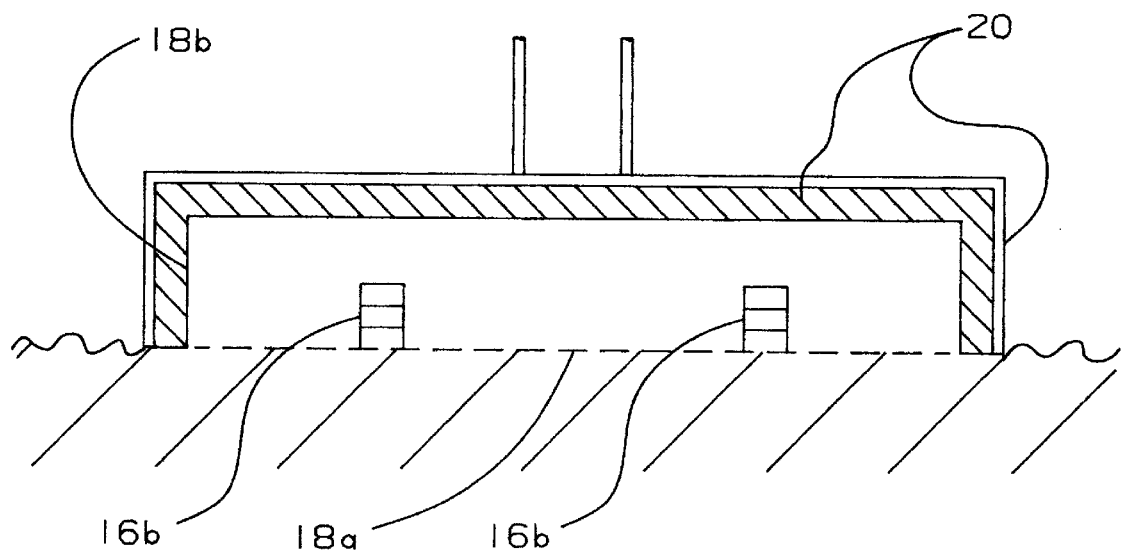
Figure 1C:
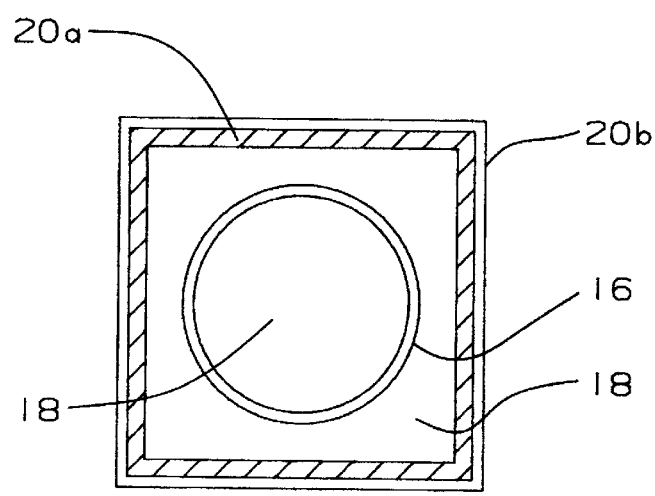

A preferred embodiment of the heat collector of the present invention is illustrated in FIG. 1A (top view), FIG. 1B (side view), and FIG. 1C (bottom view).

Heat collector 12 has a coil of heat transfer line, passage for heat transfer fluid, flow passage, or conduit 16, containing a heat transfer fluid, heat transfer medium, or fluid within, and which has a heat transfer fin, fin material, or fin 18 attached. The conduit is ported to and from a load 10, in a closed loop. The heat transfer fluid flows within the loop, out of the heat collector, to, through and out of the load, and then back to and through and out of the heat collector. In the preferred embodiment, the conduit is a coil of copper tubing 16a, the heat transfer fluid is refrigerant, the fin is a solid block of aluminum, cast to envelope the coil as an internal insert in the fin, and the load is a geothermal heat pump.

The conduit, however, can be of any other suitable material, such as aluminum or plastic, or can even be formed as part of the fin. The fluid can be any heat transfer fluid used by the load such as refrigerant, antifreeze, brine, eutectic, steam, etc. The fin can be of other materials that conduct and diffuse heat, such as graphite, copper, quartz, silicone grease, beryllium, cementitious grout, cast iron, Niobium, Nickel, Magnesium, molybdenum, low carbon steel, stainless steel, and others.

The Conducting Surface

One portion of the entire surface of the fin, its heat conducting surface, or conducting surface 18a, lays against the ground 14. The conducting surface could be other than flat, and the heat source other than the earth; for example, a saddle-shaped conducting surface would better fit over a pipe used as a heat source. In some applications, heat collector performance will be improved if the conducting surface is normal to the flow of heat from the source, as when heat is flowing upward from the interior of the earth, for instance. The collector should be as closely coupled to the source as possible. Closely coupled means that, insofar as is possible, all of the conducting surface is in physical contact with the heat source.

The Insulated Surface

The portion of fin surface which is not conducting surface is the fin's non-conducting surface, covered surface, or insulated surface 18b. A cover 20 covers and insulates the fin's insulated surface. In the preferred embodiment, the insulation 20a is heavy asphalt impregnated and vapor resistant rigid sheet material with sealed joints, and with aluminum foil facings, or heat reflectors 20c. The insulation is overlaid on its exposed surface with ¼ inch plywood cover material 20b treated or painted for exterior use. The plywood is glued to the fiberglass with weather resistant glue, then caulked at the corners and edges. Other insulating materials can be used including cork, foam, cotton, air, vegetation, manure, manure mixed with straw, fire brick, alumina, glass block expanded, Kaolin insulating diatomaceous earth, siliceous high strength brick, asbestos, glass fiber, zirconia, kaolin rock, burned infusorial earth pipe covering, microquartz fiber, aluminum. silicate paper, rockwool, silk, and others. Heat reflectors 20c can include, besides aluminum foil, white plaster, mirrored glass, matte white paint, porcelain enamel, polished aluminum, stainless steel, and more. In certain applications, the insulation can be used without either reflectors or cover material. Cover material 20b can be some other some other supporting and protecting material, such as plastic.

In other applications, there might be no cover at all, and thus no insulated surface, i.e., the conducting surface comprises the entire fin surface. For instance, the fin could be buried uncovered in the earth. Also there could be more than one heat source. For example, the fin could be uncovered on the surface, and conducting from two sources at once, e.g., from earth and air.

The Ports

Figure 1D:
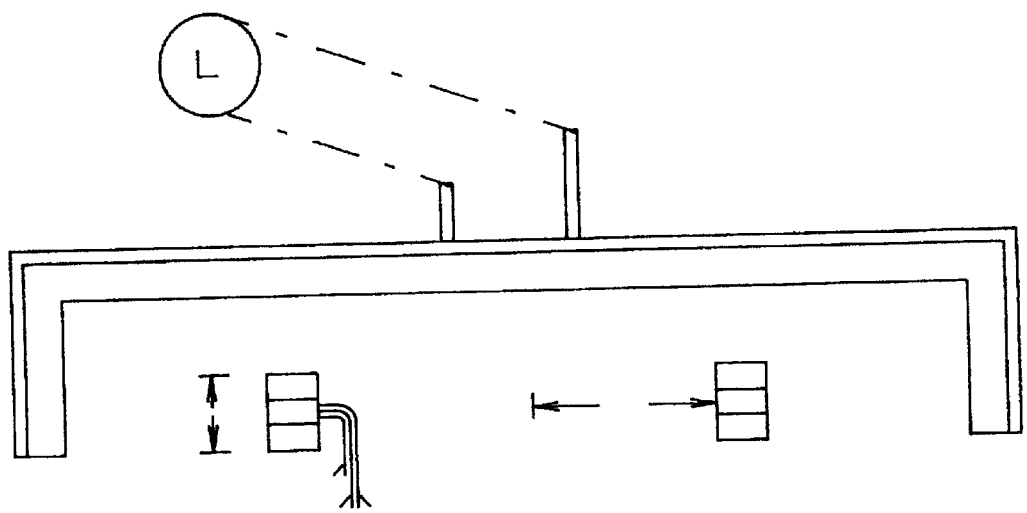
FIG. 1D shows heat flow, height of coil, and distance of lateral heat flow.
Figure 1D:
Figure 1D:
Figure 1D:

The ends of the copper tubing, ports, fittings, heat transfer line extensions, conduit extensions, copper tubing extensions, or tubing ends 16a extend out of the heat collector for connection to load 10, represented in FIG. 1D by an encircled 'L'. Ports, or fittings 16a can be installed in the cover to provide an interface between the conduit and the load. If these ports are fittings, they can be of standard or of quick coupling design.

The Openings in the Cover

The openings in the cover at ports 16a can be caulked to weather-proof, and to minimize leakage of heat around the ports.

The Load

The load can be a heat pump, in either heat mode or cooling mode, or it can be a heat engine, or any heat recovery or heat sinking device.

The Heat Source or Sink

Heat source, heat sink, surface of the earth, ground, or earth 14, can be anything which is thermally coupled to the heat collector, and which has a temperature different from that of the fluid, whether that temperature be higher or lower than the temperature of the fluid. In the preferred embodiment, the heat source is the earth.

Dimensions

Typical dimensions of the heat collector are 1.216 meters by 1.216 meters by 10.16 centimeters.

Distance for Lateral Heat Flow

Referring to FIG. 1D, the lateral distance that heat travels, or flows, within the fin to the coil should not exceed alpha(fin)/alpha(soil) times the coil height, where alpha(fin) is the thermal diffusivity of the fin material, and alpha(soil) is the thermal diffusivity of the soil. Thermal diffusivity is defined as the thermal conductivity divided by the volumetric heat capacity of the material in question.

For example, aluminum has thermal diffusivity 700 times that of an average soil. A coil of four turns of 1.27 centimeters diameter copper tubing layered vertically would have a coil height 5.08 cm. Therefore, the lateral distance for heat flow could be as much as 3,556 cm. in the preferred embodiment the tubing is 1.27 cm diameter and in only one layer, i.e., the coil height is 1.27 cm.

Area of the Conducting Surface

Conducting surface 18a of fin 18 must be at least as large as the heat transfer surface of coil 16b. For instance, if load 10 requires 140 meters of 1.27 cm diameter copper tubing in a trench 70 meters long, or in a vertical bore 70 meters deep, then the heat transfer area of the tubing is approximately 4.88 square meters. The conducting surface should therefore be at least 4.88 square meters when closely coupled to the load, more as necessary if loosely coupled.

In addition, the magnitude of the conducting surface area is also determined by ground temperatures, load operating temperatures, and the desired depth of temperature projection, or penetration.

Accessing Deep Earth Temperatures

Figure 1E:
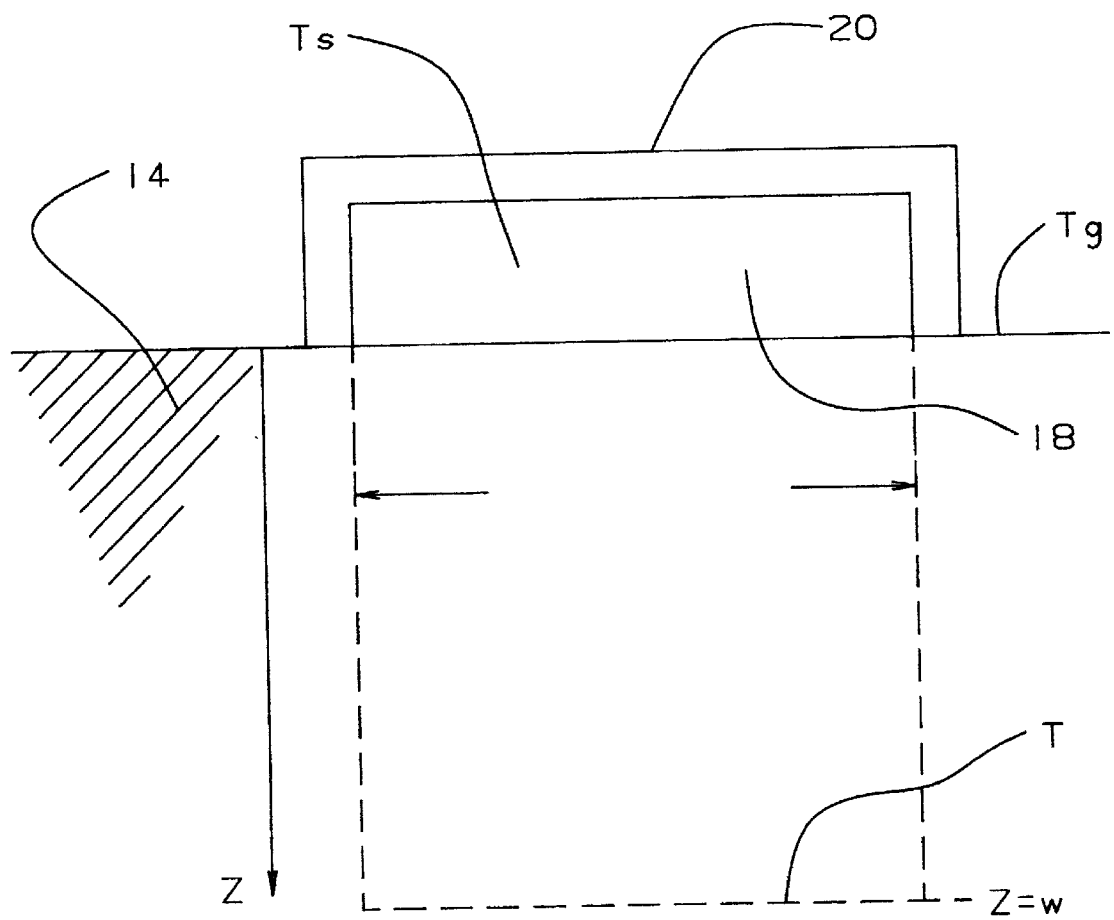
FIG. 1E shows a projection of a load temperature to a depth.

For example, referring to FIG. 1E, if the desired depth of temperature penetration is w=1.216 meters, and if the load operating temperature is T(s)=(−17.8 C), and if the ground temperature is T(g)=(−6.7C), then the simplified expression to estimate the temperature T projected to a depth w is T=(T(s)+(T(g)−T(s))/4, for a collector of width w, and for negligible geothermal gradient. Thus the temperature projected by the load, T(s), to a depth of 1.216 meters is T=(−15C). If this projected temperature is acceptable for the application, then the heat collector should have width w.

The conducting surface area then should be the larger of either the area determined by the coil, or that determined by the desired depth.

The same temperature will be projected to depth 10 meters, for a collector of width 10 meters, if all other conditions are the same as in the example. Solutions for the cooling mode are similar, if the proper changes in the temperature conditions are made.

Shape of the Penetrated Volume

For a square fin of width w, the penetrated volume will be a cube of side w. A round fin will penetrate a right circular cylinder of diameter w and depth w. Other fin shapes will determine the shapes of their corresponding volumes.

Rate of Penetration

A temperature front moves slowly into the earth. Therefore, a load which is not continuous might be better served by a heat collector which is wide enough and the insulation thick enough, to maintain acceptable temperatures even when the load is not operating.

The above equations and their discussion, can be found in *Geotechnical Engineering for Cold Regions*, "Ground Thermal Regime", R. L. Harlan and John F. Nixon, pp. 132, 133, 134–137.

The equations should be used as starting estimates only. They need to be augmented with actual experience in specific applications.

While the above equations, calculations, and considerations are deemed to be correct, I do not wish to be bound by them.

Location of the load

While load 10 could be mounted upon the heat collector, it is located remotely from the heat collector in the preferred embodiment.

The space used by the heat collector can be recovered for other uses by letting it into the ground, in a shallow hole, or by placing it under a building, or under a parking lot, etc.

Operation of Heat Collector

The manner of using the heat collector is to simply lay it on the ground, conducting side down, and connect it to the load. The soil can be prepared beforehand to ensure a close thermal coupling between earth and heat collector. The perimeter can be sealed with dirt or other insulating material. If wind or other forces might be present, the heat collector can be staked, or even weighted down.

FIG. 2—Description of the Modular Version

FIGS. 2A–2D show heat collectors connected together, or ganged in load fashion to make a large heat collector. Modules are ganged in load fashion when one module is arranged to be a load for another. The modules can be made without covering on the sides to provide thermal contact between the fins of separate modules.

Figure 2A:
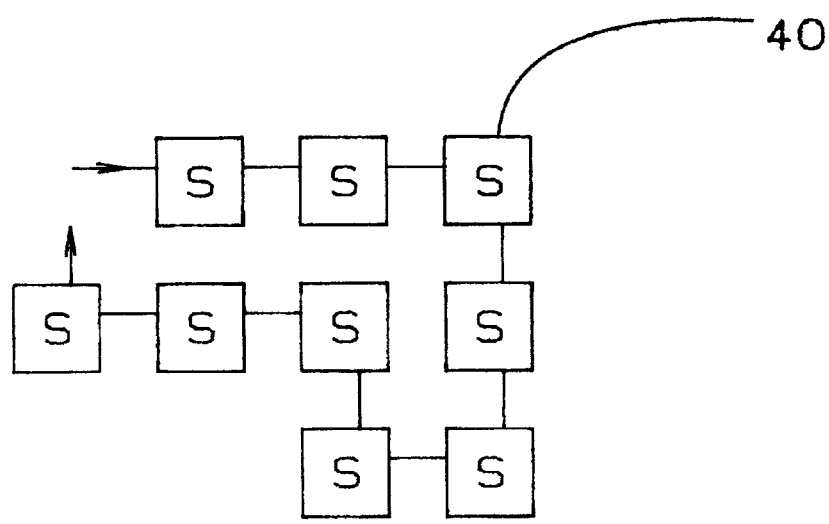
FIGS. 2A–2N show heat collector modules, either ganged or separated.
Figure 2B:
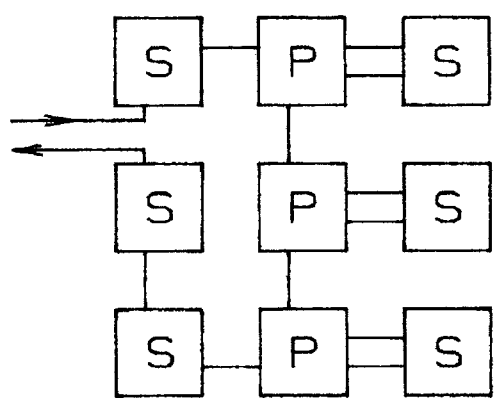
Figure 2C:
Figure 2D:
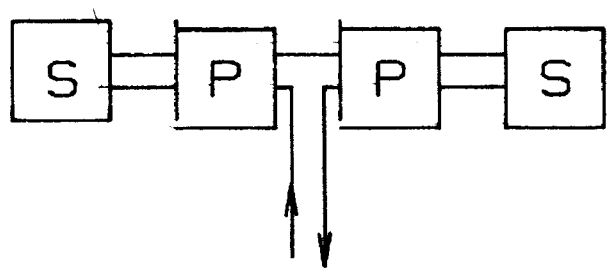
Figure 2E:
Figure 2F:
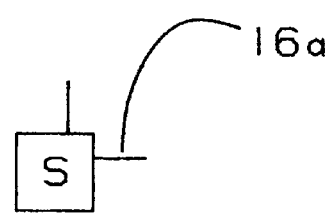
Figure 2G:
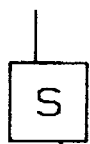
Figure 2H:
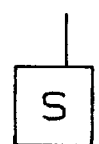
Figure 2I:
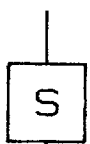
Figure 2J:
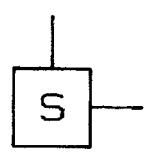
Figure 2K:
Figure 2L:
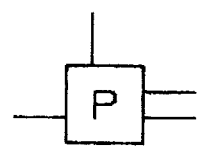
Figure 2M:
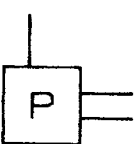
Figure 2N:

FIGS. 2E–2N show some of the various possible arrangements for porting modules. FIG. 2E shows a series module with ports on the same side. Figure shows ports on a corner. FIGS. 2G and 2F show opposite sides and opposite corners. FIG. 2I shows opposite sides from the centers. FIG. 2J shows adjacent sides from the centers. FIG. 2K shows a parallel module with ports on opposite sides. FIG. 2M shows opposite corners. FIGS. 2L and 2N show opposite side, opposite corner.

Clearly other possibilities exist, including ports from the bottom or from the top of the module.

Operation of Modular Version

The manner of operating the modular version is identical to the operation of the heat collector of FIG. 1, except that the modules must first be ganged. Ganging can be either in series, shown in FIG. 2A with an "S" within a square, or in parallel, shown in FIG. 2C with a "P" within a square, or in some combination of both series and parallel (FIGS. 2B and 2C) For some layouts, series ganging might result in long connections to the load. In these cases, parallel ganging might be preferred. The alternative embodiment (FIG. 4B) listed below can be used for parallel ganging.

FIG. 3—Description of Buried Version

Figure 3A:
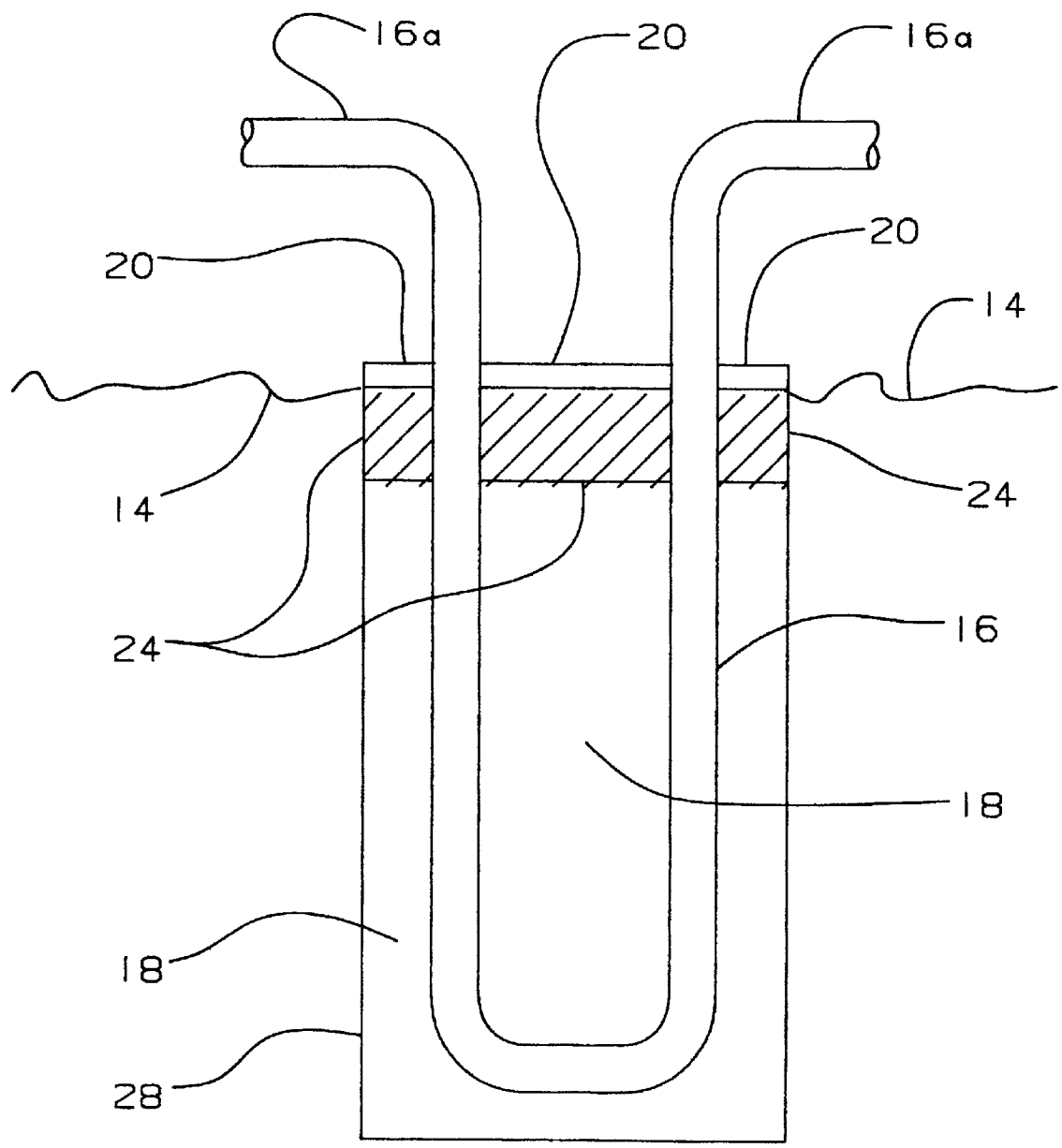
FIG. 3A is in a vertical hole configuration, and FIG. 3B has a saddle shape.
Figure 3B:
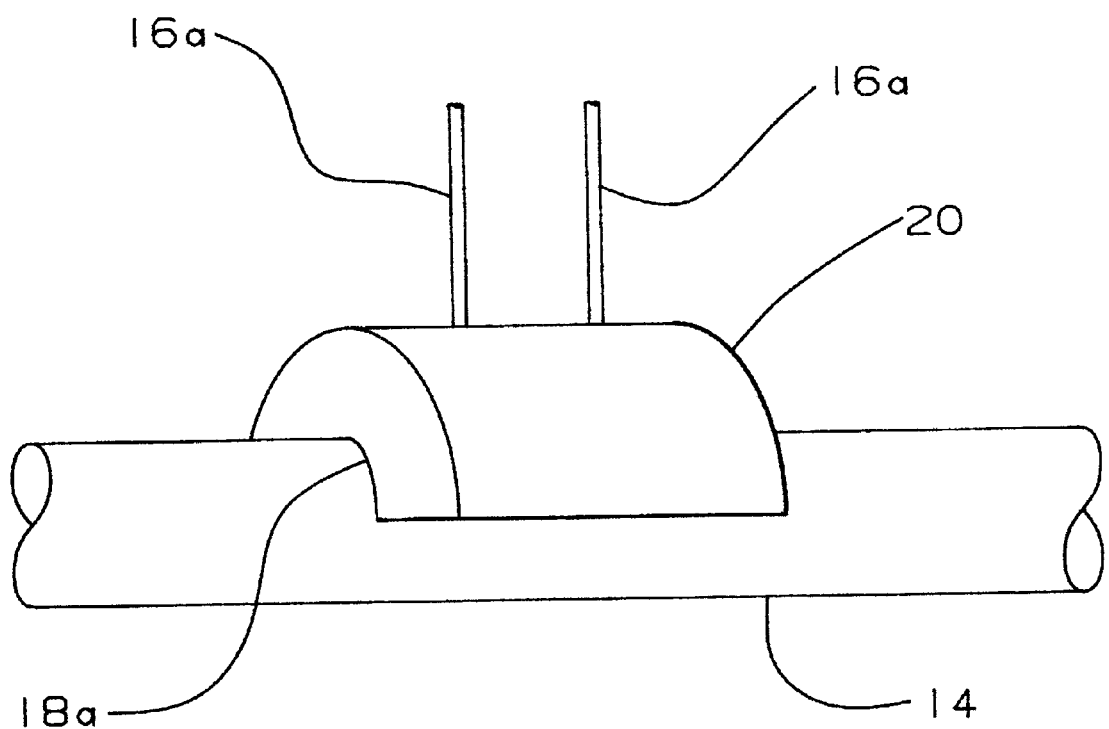
FIG. 3 shows two buried versions of heat collector.

FIG. 3A shows a heat collector configured to fit into a vertical hole in the ground. The fin is either poured directly into the hole before or after the conduit is inserted, or it is prefabricated with the conduit. A dead air space 24 provides the insulation.

The saddle version (FIG. 3B) is identical to the heat collector of FIG. 1, except that it is shaped for thermal coupling over the top of a pipe heat source.

Operation of Buried Version

Operation of the buried version is identical to that of the heat collector of FIG. 1. It can also be operated in the modular version. The saddle version can also be used in above ground operation.

FIG. 4—Description of Alternative Embodiments

Figure 4A:
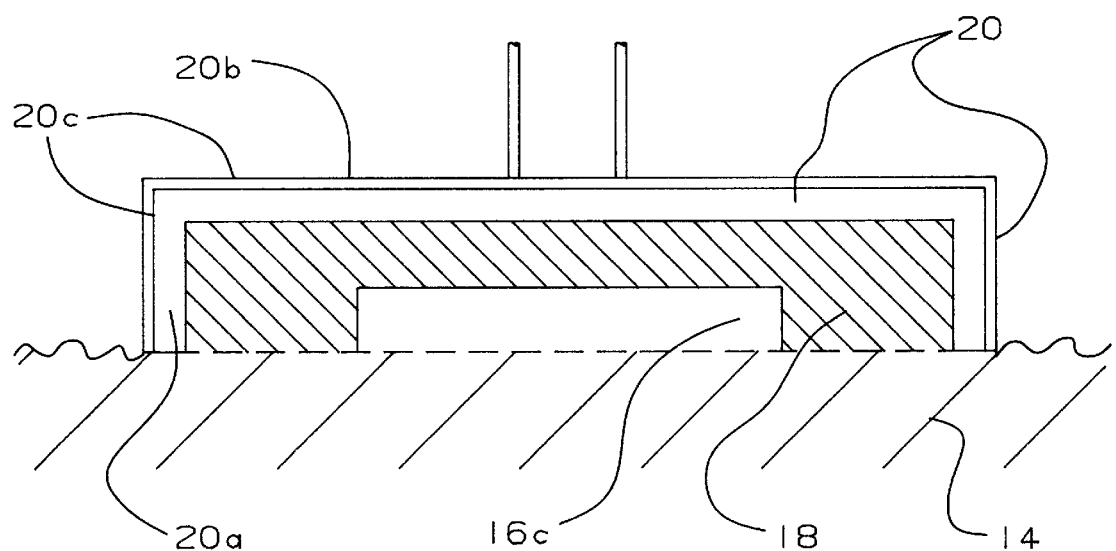
FIG. 4A shows an accumulator-type of conduit, FIG. 4B a pipe and header conduit, FIG. 4C an irregular shaped conducting surface.
Figure 4B:
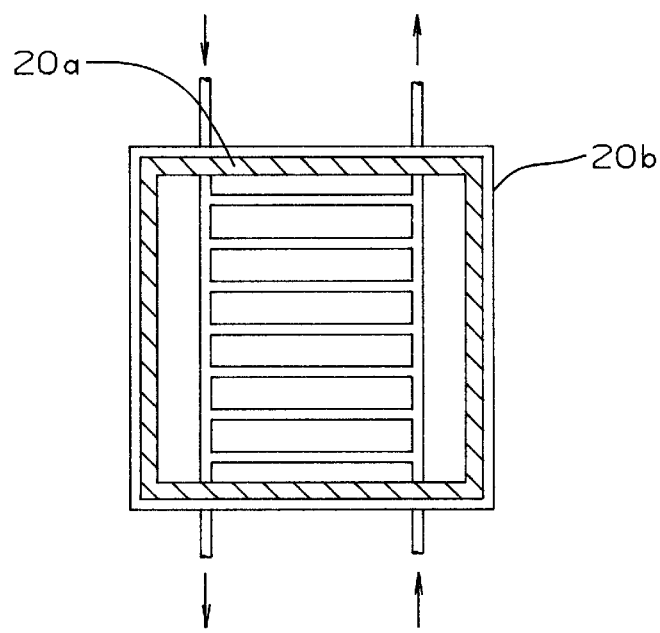
FIG. 4D shows a greenhouse type of cover.
Figure 4C:
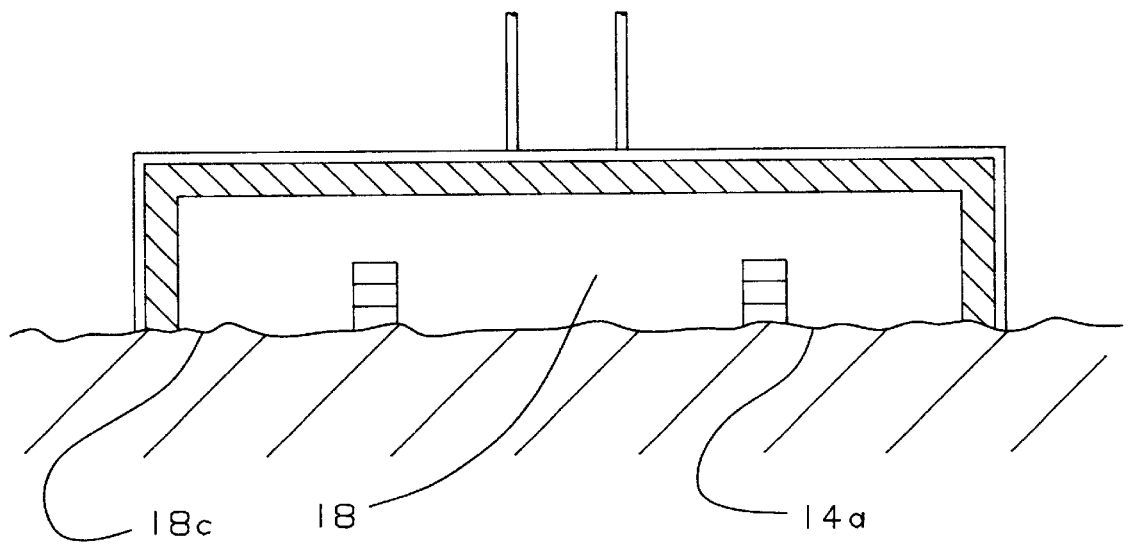
Figure 4D:
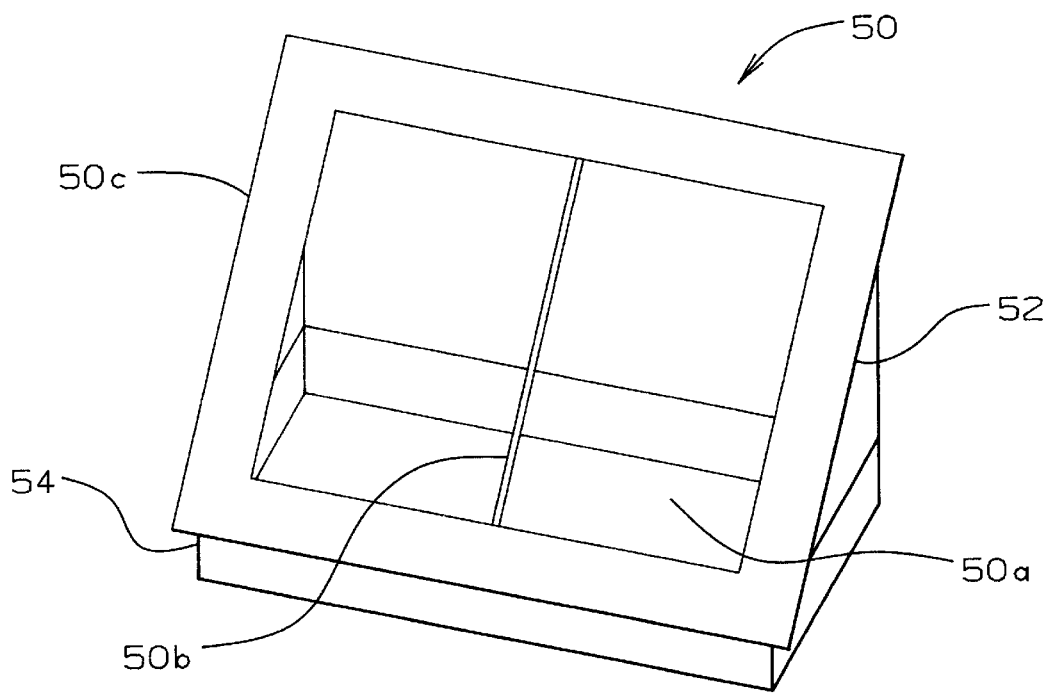

There are various possibilities with respect to the shape and construction of the coil 16, cover 20, or fin 18. FIG. 4A shows an accumulator type of coil 16c. FIG. 4B shows a pipe and header configuration. Arrows in the figure show the direction of flow at the ports. FIG. 4C shows an irregular conducting surface 18c coupled to a heat source of irregular depth 14a. If the fin material is very hot, such as molten aluminum, some sort of heat sink provision might be required. This is to prevent the explosion of rock or similar material. Also the coil might need to be cooled, perhaps by flowing nitrogen gas through the coil during the cooling period. This is to draw the molten material tight against the coil, for good thermal coupling. FIG. 4D shows a greenhouse type of cover. Greenhouse cover 50 can be made like a typical cold frame. It has an insulated frame 54 with a bevel 52 to tilt the glass 50 to the sun. The frame 50c for the glass overhangs frame 54, to provide drainage. Glass divider 50b adds support for the glass. The greenhouse type can be covered at night with insulating material, to minimize heat loss due to nighttime temperatures.

Operation of Alternative Embodiments

The operation of the alternative embodiments is identical to that of other embodiments.

Conclusions, Ramifications, and Scope

Accordingly, the reader will see that the heat collector of this invention can be used to collect geothermal heat for a heat pump without the necessity of drilling, trenching, or other excavation; and that in the cooling cycle of the heat pump the heat collector can be used to sink heat to the earth. In addition, it can collect heat for a load by accessing deep earth temperatures. In particular, it can be used to obtain the benefits of deep trenching, such as at 1.216 meters depth or deeper, or of vertical boring, such as to 10 meters depth or more. Also, a long trench or a deep vertical bore can be replaced by a relatively small surface area.

Furthermore, the heat collector has the additional advantages in that:

- it is portable, and easy to move from place to place;
- it can be premanufactured, or it can be easily and economically constructed on the job, using widely available materials;
- it can be adapted to different sources of heat or heat sink;
- it can be adapted to an infinite variety of shapes and sizes;
- it can be used for heat recovery in applications where fluid to fluid heat exchange is difficult or impossible;
- it can collect heat from the earth, heat from the sun, or both;
- it can adapt to modular construction, making possible the assembly of large collectors from a gang of small, more easily managed heat modules;
- a large selection of materials is available for every component;
- it requires no use permit, such as might be required for downhole heat exchangers;
- it can be used anywhere on earth, or even on another planet;
- installation is easy and inexpensive, and requires no special skills or equipment;
- it does not pollute the environment;
- it can be used to collect heat, or to sink it, and
- it can be used in vertically drilled holes, or in excavated holes, to reduce the required length of trench, depth of vertical hole, or area of excavation.

Although the description above contains many specificities, these should not be construed as limiting the scope of the invention but as merely providing illustrations of some of the presently preferred embodiments of this invention. For example, the heat collector can have other shapes, such as circular, oval, trapezoidal, triangular, ect. Inlets and outlets to the coil can be located anywhere on the heat collector. The load can be mounted anywhere on the heat collector which proves convenient, or it can be remotely located. In addition to operating as a heater or cooler it can also be use to exchange heat to function as a boiler, a steam generator, a condenser, a radiator, an evaporator, a cooling tower, a regenerator, a recuperator, or other heat exchanger. The fin can be other than block shaped, etc.

Thus the scope of the invention should be determined by the appended claims and their legal equivalents, rather than by the examples given.

I claim:

1. A geothermal heat collector which is simply laid on the ground to collect heat for a load by accessing deep earth temperatures without drilling, trenching, or other excavation, comprising:
   (a) a heat transfer fin means to readily conduct and rapidly diffuse heat, and a portion of the surface of said fin means is a heat conducting surface, and a portion of said fin surface is an insulated surface;
   (b) a heat transfer conduit arranged to contain a heat transfer medium in heat exchange relationship with said fin means, and said conduit is ported to and from a load means;
   (c) an insulating cover arranged to minimize heat loss from said insulated surface, and
   (d) said conducting surface is thermally coupled to a heat source or heat sink.

2. The heat collector of claim 1 wherein said conducting surface comprises the entire fin surface.

3. The heat collector of claim 1 wherein said heat transfer conduit is a coil of copper tubing, said fin means is a block of cast aluminum, and said coil is an internal insert in said aluminum.

4. The heat collector of claim 3 wherein said fin means is silicone grease spread over and around said coil, instead of said cast aluminum.

5. The heat collector of claim 1 wherein said insulating cover is greenhouse type.

6. The heat collector of claim 1 wherein said insulating cover is fiberglass overlaid with plywood.

7. The heat collector of claim 1 wherein said heat transfer conduit is formed into said fin material.

8. The heat collector of claim 7 wherein said conduit is configured to provide an accumulator for said heat transfer fluid.

9. The heat collector of claim 1 wherein said heat collector is shaped for thermal coupling with a pipe heat source.

10. The heat collector of claim 1 wherein said heat source is of irregular depth and said conducting surface is shaped to closely couple with said heat source.

11. The heat collector of claim 1 wherein said heat collector is one module among a collection of similar modules, arranged to provide a large heat collector, and said modules are series ganged to one another in load fashion.

12. The heat collector of claim 11 wherein said modules are parallel ganged.

13. The heat collector of claim 11 wherein said modules are ganged in both series and parallel.

14. The heat collector of claim 1 wherein said heat transfer conduit is in a pipe and header configuration.

15. An improved geothermal heat collector comprising:
   (a) a heat transfer fin means to readily conduct and rapidly diffuse heat, and a portion of the surface of said fin means is a heat conducting surface, and a portion of said fin surface is an insulated surface;
   (b) a heat transfer conduit arranged to contain a heat transfer medium in heat exchange relationship with said fin means, and said conduit is ported to and from a load means;
   (c) an insulating cover arranged to minimize heat loss from said insulated surface, and
   (d) said conducting surface is thermally coupled to a heat source or heat sink.

16. The heat collector of claim 15 wherein said heat collector is in a vertical hole configuration.

17. A method to collect heat for a load by accessing deep earth temperatures without drilling, trenching, or other excavating, comprising the steps of:
   (a) providing a fin means to conduct and diffuse heat, and said fin means has a conducting surface and an insulated surface;
   (b) providing a heat transfer conduit arranged to contain a heat transfer medium in heat exchange relationship with said fin means, and said conduit is ported to and from a load;
   (c) providing an insulating cover arranged to minimize heat loss from said insulated surface, and
   (d) said conducting surface is thermally coupled to a heat source.

18. The method of claim 17 wherein said conducting surface is thermally coupled to a heat sink instead of to said heat source.

* * * * *